(12) United States Patent
Moretto

(10) Patent No.: US 11,122,773 B2
(45) Date of Patent: Sep. 21, 2021

(54) DRINKING BOWL FOR DOMESTIC ANIMALS

(71) Applicant: LAICA S.P.A., Barbarano Mossano (IT)

(72) Inventor: Maurizio Moretto, Vicenza (IT)

(73) Assignee: LAICA S.P.A., Barbarano Mossano (IT)

( * ) Notice: Subject to any disclaimer, the term of this patent is extended or adjusted under 35 U.S.C. 154(b) by 108 days.

(21) Appl. No.: 16/349,344

(22) PCT Filed: Nov. 17, 2017

(86) PCT No.: PCT/EP2017/079645
§ 371 (c)(1),
(2) Date: May 13, 2019

(87) PCT Pub. No.: WO2018/091672
PCT Pub. Date: May 24, 2018

(65) Prior Publication Data
US 2019/0343074 A1    Nov. 14, 2019

(30) Foreign Application Priority Data
Nov. 17, 2016   (IT) .................. 102016000116480

(51) Int. Cl.
*A01K 7/02* (2006.01)
(52) U.S. Cl.
CPC .................... *A01K 7/025* (2013.01)
(58) Field of Classification Search
CPC ............. A01K 7/00; A01K 7/02; A01K 7/025

USPC ............................................ 119/72, 72.5, 74
See application file for complete search history.

(56) References Cited

U.S. PATENT DOCUMENTS

| 1,883,631 | A | * | 10/1932 | Dunlevy | A01K 39/02 |
| | | | | | 119/73 |
| 4,584,966 | A | * | 4/1986 | Moore | A01K 7/00 |
| | | | | | 119/73 |
| 6,467,428 | B1 | | 10/2002 | Andrisin et al. | |
| 6,640,748 | B1 | * | 11/2003 | Cheng | A01K 7/06 |
| | | | | | 119/72 |
| 7,849,817 | B1 | | 12/2010 | Warganich | |
| 8,555,816 | B2 | | 10/2013 | Weber et al. | |
| 8,985,054 | B2 | * | 3/2015 | Lipscomb | A01K 7/02 |
| | | | | | 119/74 |
| 2010/0050950 | A1 | * | 3/2010 | Graves | A01K 7/005 |
| | | | | | 119/81 |
| 2012/0017839 | A1 | * | 1/2012 | Veness | B01D 33/27 |
| | | | | | 119/74 |
| 2013/0092090 | A1 | * | 4/2013 | McCallum | A01K 1/0356 |
| | | | | | 119/74 |

(Continued)

*Primary Examiner* — Brady W Frazier
(74) *Attorney, Agent, or Firm* — Volpe Koenig

(57) ABSTRACT

A drinking bowl (100) for domestic animals comprises a collecting basin (1), a removable container (2), a filtering element (3) which is arranged so as to close an opening (20) of the removable container (2) and a ventilation pipe (4) which extends between opposite ends of the removable container (2) and which opens inside the removable container (2) at a first end (41, 42) and downstream of the filtering element (3) at a second end (41, 42). The second end (41, 42) further comprises a widened portion (420) which is capable of channeling a flow of liquid inside the ventilation pipe (4) for introducing liquid inside the removable container (2).

20 Claims, 4 Drawing Sheets

(56) References Cited

U.S. PATENT DOCUMENTS

2013/0213308 A1\* 8/2013 Koskey, Jr. ............ A01K 7/027
119/74

\* cited by examiner

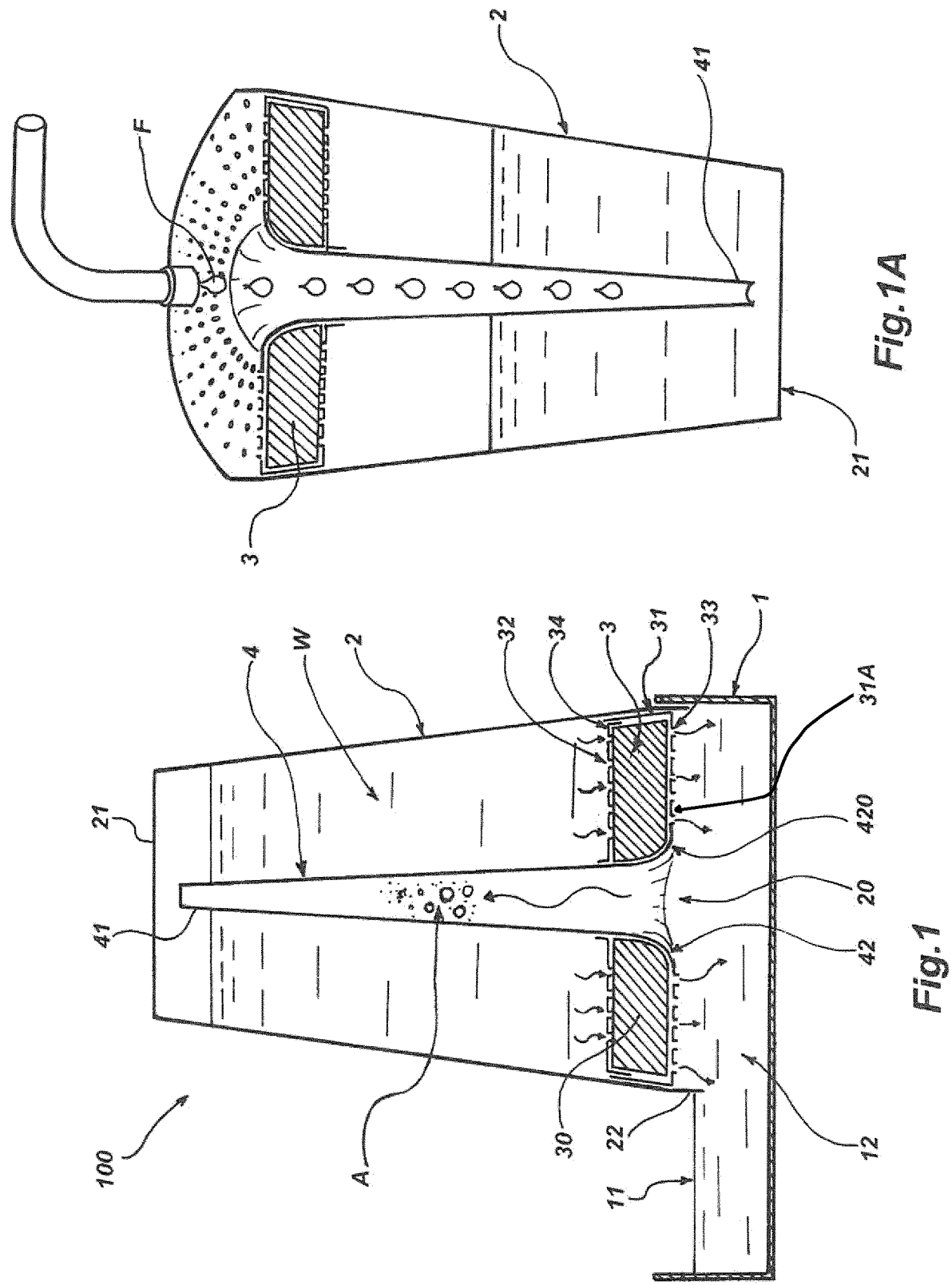

DRINKING BOWL FOR DOMESTIC ANIMALS

The present invention relates to a drinking bowl for domestic animals of the type comprising a collecting basin, a removable container adapted to be arranged above the collecting basin and a filtering element.

In the context of the technical field being referred to there are known various solutions for administering water to domestic animals.

U.S. Pat. No. 6,467,428 describes a drinking bowl which comprises a bowl above which a bottle-shaped container is arranged. The bowl comprises a region in which the container is arranged and which has a portion which remains accessible once the container is positioned on the bowl.

The liquid present in the container is poured inside the bowl through an opening which is closed by means of a closure member which contains an activated carbon filter.

The drinking bowl further comprises a tube which extends along the container externally with respect thereto. A first end of the tube opens inside the container in the region of the upper portion thereof, while the second end comprises an opening which is arranged during use under a closure member which is provided with an outlet for the water from the container. The closure member allows support of a filter through which the water is filtered before being poured into the bowl by means of the above-mentioned outlet.

As a result of the above-described arrangement, when the level of the water in the bowl is reduced below a given level, a passage of air is allowed through the tube towards the inner side of the container, allowing the introduction of additional water.

However, this solution is not found to be very practical for filling the container, it being necessary to this end to remove the closure member and then to insert it again once the container has been filled.

A further solution of a drinking bowl for domestic animals is disclosed in U.S. Pat. No. 8,555,816 B2. Such document refers to an animal watering system including a water tank, an interior container and base for connecting to a bowl. The interior container fluidly connects the water tank and the base/bowl. The interior container in addition to supplying water from the water tank to the bowl, also receives water from the bowl as it circulates. The interior container includes a filter to filter the water as it leaves the water tank and enters the bowl and as it flows from the bowl into the interior container.

Also in this case, filling the container is not practical, it being necessary to this end to remove the interior container and then to position it again once the tank has been filled. Furthermore, no ventilation is provided for allowing air to enter the water tank when water passes through the filter and the tank is accordingly emptied.

Therefore, the technical problem addressed by the present invention is to provide a drinking bowl for domestic animals which allows one or more of the disadvantages mentioned above with reference to the prior art to be overcome.

Another object of the present invention is to provide a drinking bowl for domestic animals which is provided with a water filtration system which is particularly practical during the filling steps, in particular which does not require the removal of any component from a removable container while being filled with water.

A further object of the present invention is to provide a drinking bowl for domestic animals that allow proper introduction of air in the bowl and accordingly proper passage of water through the filter bed during filtration.

This problem is solved and one or more of these objects are achieved by the drinking bowl for domestic animals according to claim 1.

Preferred characteristics of the invention are defined in the dependent claims.

The present invention has a number of relevant advantages. The main advantage involves the drinking bowl according to the present invention being able to be readily filled without removing any element, notwithstanding the presence of a water filtration system. Furthermore, according to preferred aspects, the drinking bowl of the present invention allows effective filtration, also in term of air escaping, and can be produced in a simple manner.

According to a further aspect, the invention also relates to a drinking bowl for domestic animals according to claim 2.

Also in this case the which the water filling steps are particularly improved, since the annular portion of the support base allows a funnel-effect, similarly to the previous case, thus water can be filled in the container without requiring the removal of any component from the container.

The characteristics and advantages of the invention will be better understood from the detailed description of some embodiments thereof which are illustrated by way of non-limiting example with reference to the appended drawings, in which:

FIG. 1 is a schematic cross-section according to a side view of a drinking bowl for domestic animals according to the present invention;

FIG. 1A is a schematic cross-section according to a perspective side view of a removable container of the drinking bowl for domestic animals according to the present invention during a filling step.

Figure 3:
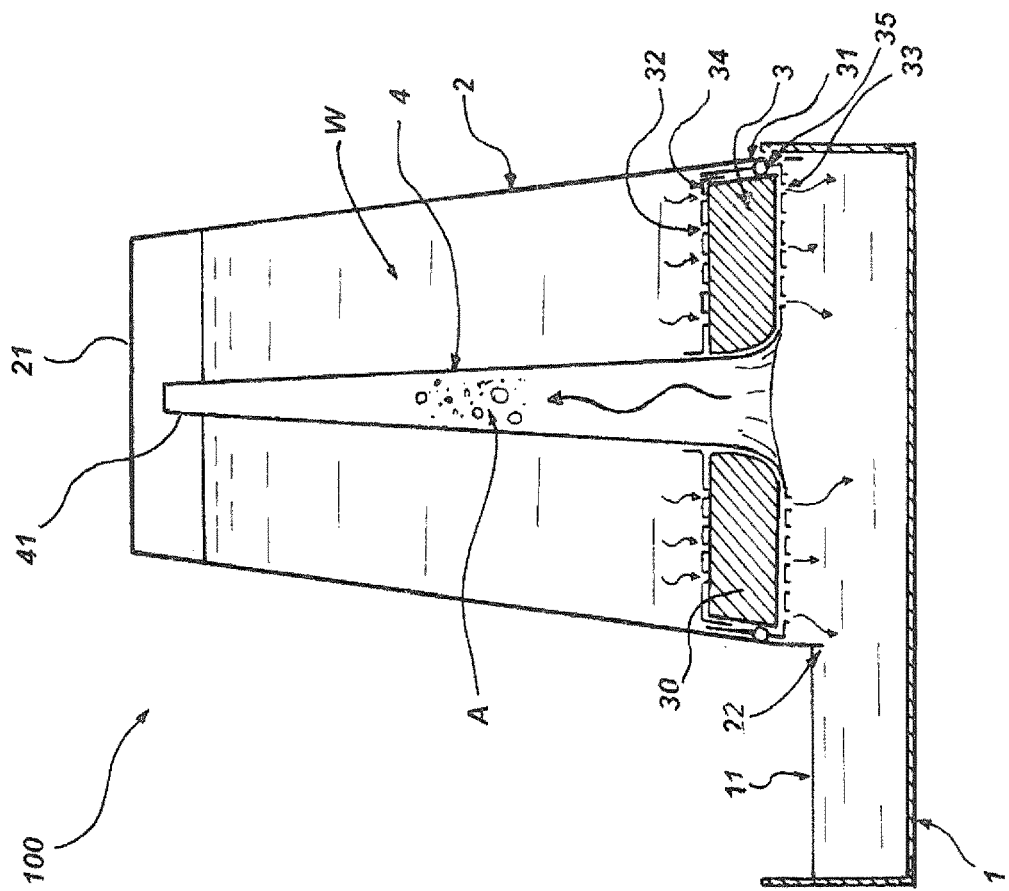
FIGS. 2 to 6 are schematic cross-sections according to a side view of respective alternative embodiments of the drinking bowl for domestic animals according to the present invention.

Initially with reference to FIG. 1, a drinking bowl for domestic animals is generally designated with reference number 100.

The drinking bowl 100 for domestic animals comprises a collecting basin 1 and a removable container 2 which can be arranged above the collecting basin 1.

According to a preferred embodiment, the removable container 2 comprises a connection element 22 with respect to a coupling portion 11 of the collecting basin 1.

By way of example, the connection element 22 can be formed as a form-fitting connection, on the basis of which the element 22 is inserted in a seat of the coupling portion which is shaped accordingly. It is evident that, alternatively to the form-fitting connection, the connection element could be obtained by means of a threading or by means of a bayonet type coupling.

As can be seen in FIG. 1A, according to a preferred embodiment, the removable container 2 has a substantially conical or cylindrical form which is advantageously suitable for having a connection element 22 of the types mentioned above.

As schematically illustrated in FIG. 1, in one embodiment, the removable container 2 comprises a base or end which is closed by a base wall 21 and an open base or end which defines an opening 20, by means of which water can be introduced inside the container 2, according to methods which will be set out more clearly below. In one embodiment of the invention, the opening 20 is positioned so as to face the collecting basin 1 when the removable container 2 is arranged above the collecting basin 1. In this manner, the removable container 2 is placed in communication with the collecting basin 1 and the water present therein can flow towards the collecting basin 1 via the opening 20 according to methods which will be better described below. To this end, when the container 2 is arranged on the coupling portion 11, there remains defined a free portion 12 of the collecting basin 1, which the water enters and at which the domestic animal has access to the water.

The bowl according to the present invention further comprises a filtering element 3 which is arranged so as to at least partially close the opening 20. Preferably, the filtering element 3 is arranged in such a manner that the water present in the removable container 2 has to pass through the filtering element 3 during the discharge travel thereof towards the collecting basin 1. There is thus defined a filtration path P which allows improvements in the characteristics of the water, for example, in terms of removing undesirable elements which are present in the water introduced into the removable container 2.

To this end, the filtering element 3 may comprise a filtering bed 30 of various types. For example, the filtering bed may be constructed by means of impregnated fabrics of various types, resin and carbon in granules/flakes, membranes of various types, carbon block materials.

In one embodiment, the filtering element 3 is fixed in a removable manner to the removable container 2 at the opening 20.

This characteristic allows the filtering element to be removed and replaced if the filtering bed is depleted. In addition, it is possible to release the opening and to gain access to the removable container, for example, for cleaning operations.

The filtering element 3 is preferably fixed to the opening 20 by means of a form-fitting connection, being simply fitted therein. In this manner, the filtering element 3 can be readily removed for the purposes set out above.

It may also be noted that, as illustrated in FIG. 1A, in a preferred embodiment, the opening 20 has a circular aperture and the filtering element 3 has a shape which complements it. This characteristic allows the filtering element 3 to be received more easily, it not being necessary to define a specific relative position for receiving it in the opening 20.

In an embodiment which is illustrated in FIG. 3, the filtering element 3 comprises a sealing element 35, for example, constructed by means of an O-ring or another similar seal.

Again with reference to FIG. 1, according to a preferred embodiment, the filtering element 3 comprises a supporting element 31, supporting the filtering bed 30 and through which the latter is fixed directly or indirectly to the opening 20 as previously explained.

In one embodiment, the supporting element 31 is in form of an openable enclosure, inside which there is received in a removable manner the filtering bed 30.

In this manner, there can be used various types of filters for the filtering bed which may optionally be restored by means of washing.

In one embodiment, the openable enclosure comprises a covering shell 34 which can be removed in order to allow access to the space inside the enclosure.

In one embodiment, the enclosure is formed by two half-shells which are joined together.

The joint may be both permanent and releasable for the purposes set out above. By way of example, therefore, the shell may be fixed to the enclosure by means of ultrasonic welding, heat welding, fitting, threaded connection.

It may also be noted that, in one embodiment, represented e.g. in FIG. 3, the sealing element 35 is preferably fixed to the supporting element 31 which, to this end, may have a suitable receiving seat.

Figure 5:
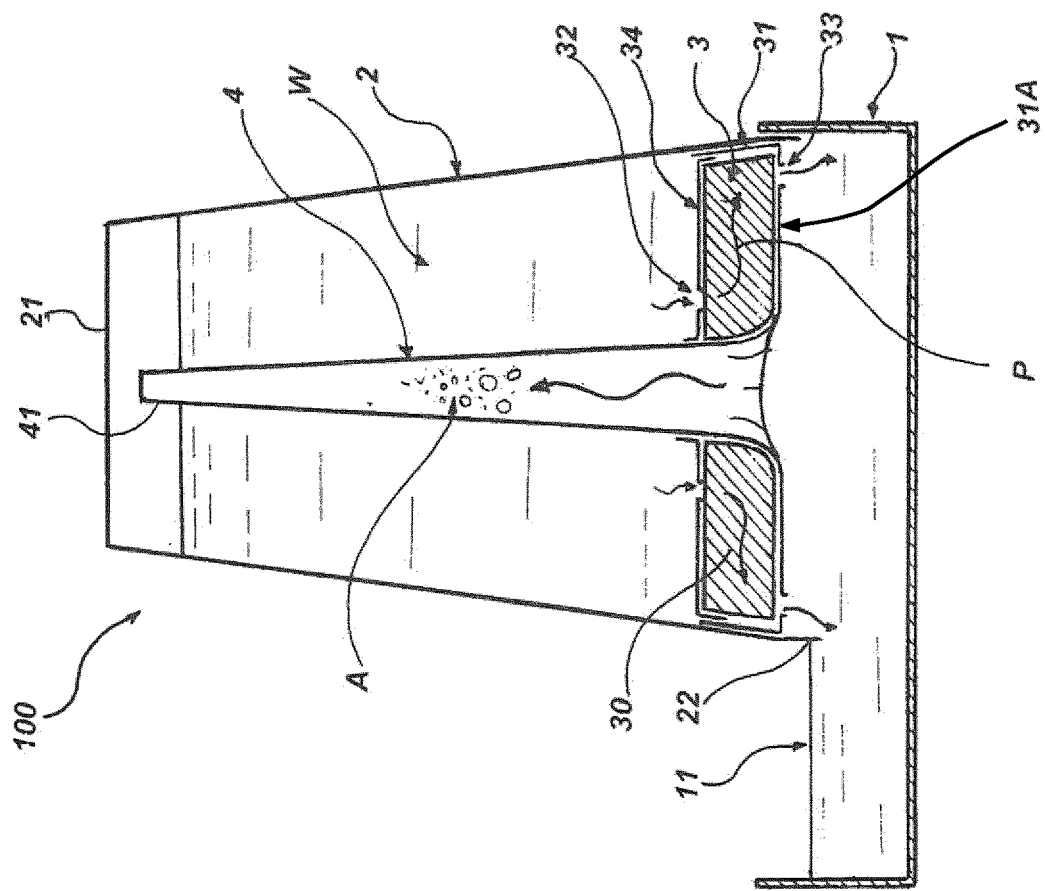

In general, the filtering element 3 may also comprise a retention portion 5 which is directed towards the outer side of the container 2 so as to allow simple removal thereof from the opening 20. This retention portion 5 is illustrated in a simplified manner in the embodiment of FIG. 5.

Again with reference to FIG. 1, in order to allow the water to pass, the supporting element 31 has a plurality of inlet holes 32, which face towards the inner side of the container 2, and a plurality of outlet holes 33 which are directed towards the outer side.

The filtering bed 30 is positioned between the inlet holes 32 and the outlet holes 33 so as to define the filtration path P described above.

Figure 4:
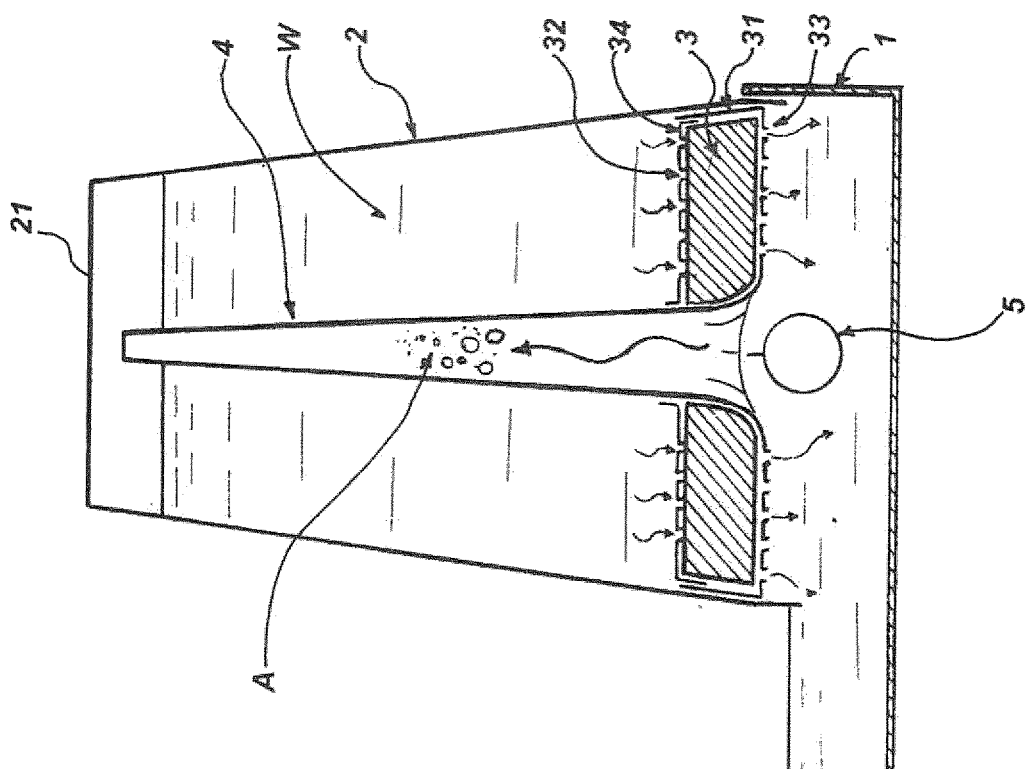

The inlet holes and the outlet holes can be distributed over the entire surface of the supporting element 31 or alternatively some of them can be arranged in the region of a central portion and some of them in the region of a peripheral portion, as schematically illustrated in FIG. 4. In this manner, there is promoted the course of the water along the filtration path P. It may also be noted that the arrangement of the inlet holes and outlet holes may be transposed with respect to the arrangement illustrated in FIG. 4.

Figure 6:
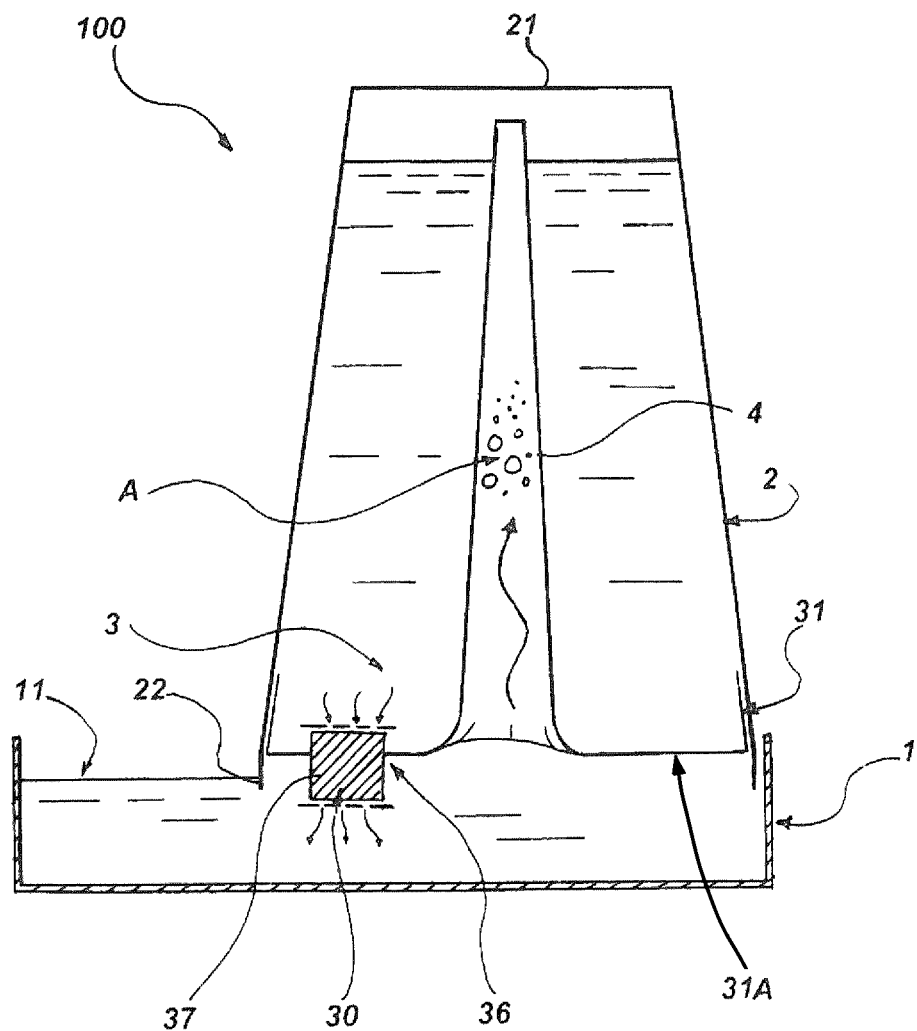

On the basis of yet another embodiment which is illustrated in FIG. 6, the filtering element 3 may comprise a filter cartridge of the replaceable type 37 which is removably fixed to the supporting element 31 which, in this case, defines a support base 31A. In one embodiment, the filter cartridge 37 comprises a date display, which is not illustrated in the Figures, for the purpose of storing the initial date of use of the filter and to establish the remaining lifetime of the filter thereof on the basis of a maximum predetermined duration. However, it is evident that, as an alternative to the date display, there may be used other devices in order to display and/or establish the remaining lifetime of the filter cartridge.

Preferably, there are provided connection means 36 between the filter cartridge 37 and the supporting element 31.

The filter cartridge 37 defines a forced path for the water, performing the same function set out above with reference to the other embodiments.

Preferably, the filter cartridge 37 is inserted in a suitable seat which is constructed on the supporting element 31 which may have a predetermined geometry, for the purpose of allowing the insertion of cartridges which are formed in a suitable manner. This prevents unsuitable or non-compatible filter cartridges from being used in the filtering element of the drinking bowl according to the present invention.

Again with reference also to FIG. 1, the drinking bowl 100 further comprises a ventilation pipe 4 which extends between opposite ends of the removable container 2.

According to a preferred embodiment, the pipe 4 extends longitudinally between a first end 41 and a second end 42.

Preferably, the pipe 4 opens inside the removable container 2 at the first end 41 and opens downstream of the filtering bed 30, or more generally the filtering element 3, at the second end 42.

Consequently, when the removable container 2 is arranged above the collecting basin 1, all the liquid present therein below the first end 41 passes through the filtering element 3 in order to be poured into the bowl 1 itself.

At the same time, the ventilation pipe 4 allows the introduction of air inside the container 2, including when it is arranged on the basin 1.

This is particularly important for the operation of the drinking bowl because, in particular if there is used a filtering bed which is quite compact, it is advantageous to allow air to enter the container 2. In fact, on the other hand, the water cannot percolate through the filtering bed, thereby impeding the regular outflow towards the collecting basin 1.

The second end comprises a widened portion 420 which allows channeling of a flow of liquid F inside the ventilation pipe 4 for introducing liquid inside the removable container 2, as illustrated in FIG. 1A.

In fact, the container 2 may be removed and filled in a simple manner by pouring the water into the ventilation pipe 4 through the widened portion 420.

To this end, the ventilation pipe 4 preferably has dimensions which are suitable for introducing liquid inside the removable container.

Therefore, it must be noted that, in this manner, it is not necessary to remove the filtering element 3 from the opening 20 in order to fill with water, simplifying this operation.

In a preferred embodiment, the ventilation pipe 4 extends internally with respect to the removable container 2 and preferably has a substantially rectilinear extent between the first end 41 and the second end 42.

In this manner, there is promoted the flow of water inside the removable container. Furthermore, a rectilinear extent allows direct introduction of the water into the removable container, thereby making the filling particularly simple by simply placing the container below a tap.

Still for the purpose of promoting the introduction of water, the widened portion 420 may have a tapered form in the direction towards the first end 41 of the ventilation pipe 4 so as to form a funnel-like member for the water.

In one embodiment, for example when the filtering element 3 and the opening have a substantially circular shape, the second end 42 is arranged in the region of a substantially central portion of the filtering element 3 or, more in general, of the support base 31A.

In this manner, an annular portion of the support base 31A is defined around the second end 42 of the pipe. It is therefore well evident that the term central should not be interpreted strictly, since it means that at a least a portion of the base is defined all-around the ventilation pipe 4. As a consequence, it is not required for the second end 42 being arranged in the region of portion corresponding to the geometrical centre of the support base 31A, being sufficient that the region is internal to the surface defined by the base 31A.

As the second end 42 is arranged in the region of a substantially central portion of the support base 31A, the annular portion also helps to collect water, thus achieving also in this case a funnel effect. In this manner it is possible to channel a flow of liquid inside the ventilation pipe when liquid is introduced inside the removable container 2.

Also, this feature allows the use of a filtering bed arranged around the opening which is defined by the second end, thus obtaining an optimum flow inside the filtering element. Furthermore, there is promoted the passage of air which is released from the filter during the time when the water percolates towards the widened portion of the pipe.

Still in order to promote the venting of air which is released by the filter during the time when the water is percolating, in one embodiment the ventilation pipe 4 is fixed to the filtering element 3, preferably the supporting element 31.

Furthermore, if the filtering element is removable, this also advantageously allows the removable container to be released from the ventilation pipe so as to allow effective cleaning thereof.

Figure 2:
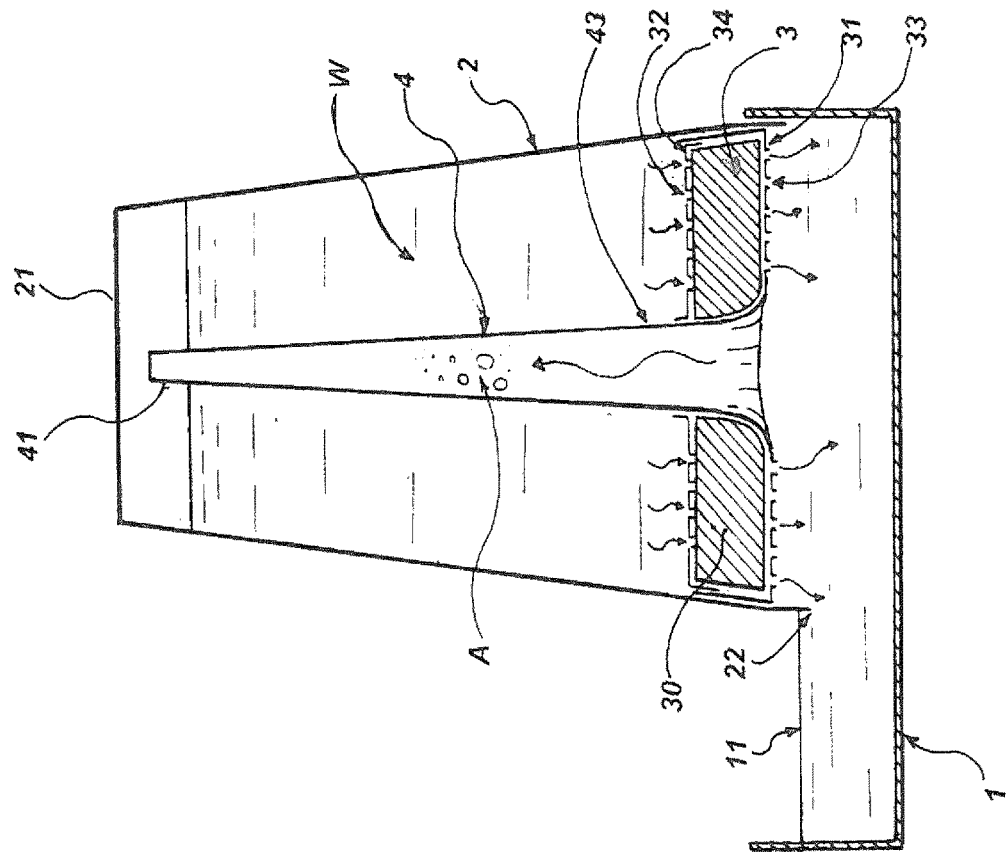

Now with reference to FIG. 2, on the basis of an alternative embodiment, the ventilation pipe comprises a first portion which is rigidly fixed to the filtering element and in which there is defined the widened portion 420 and a second portion which is of elongate form and which can be fixed in a removable manner to the filtering element. The two portions are joined by means of a removable connection 43, for example, defined by means of fitting or a form-fitting connection.

This embodiment advantageously allows a simple construction of the structure and further allows the use of filtering elements which can be replaced without any need for complete replacement of the ventilation pipe. Again with reference also to FIG. 1, preferably, in order to maximize the capacity of the removable container, the first end 41 of the ventilation pipe 4 opens in the region of the base wall 21.

In fact, in this manner the container 4 is capable of containing water so as to reach a level which is immediately below the first end.

Therefore, the invention solves the problem set, at the same time achieving a plurality of advantages, including the possibility of readily filling the removable water container without any need for removing the filtering element as a result of the characteristics of the ventilation pipe which can therefore also be used to introduce water.

The invention claimed is:

1. A drinking bowl (100) for domestic animals comprising:
   a collecting basin (1),
   a removable container (2) adapted to be arranged above the collecting basin (1), a filtering element (3) which is arranged proximate to and encircling an opening (20) of the removable container (2), the opening (20) configured to be directed towards the collecting basin (1), when the removable container (2) is arranged above the collecting basin (1) so as to place the removable container (2) in communication with the collecting basin (1), and
   a ventilation pipe (4) which extends between opposite ends of the removable container (2) and which opens inside the removable container (2) at a first end (41) and downstream of the filtering element (3) at a second end (42), wherein the second end comprises a flared portion (420), which comprises the opening (20), which is adapted to channel a flow of liquid inside the ventilation pipe (4) for introducing liquid inside the removable container (2).

2. A drinking bowl (100) for domestic animals comprising:
   a collecting basin (1), a removable container (2) adapted to be arranged above the collecting basin (1),
   a filtering element (3) which is radially arranged proximate an opening (20) of the removable container (2), the opening (20) configured to be directed towards the collecting basin (1), when the removable container (2) is arranged above the collecting basin (1) so as to place the removable container (2) in communication with the collecting basin (1), and
   a ventilation pipe (4) which extends between opposite ends of the removable container (2) and which opens inside the removable container (2) at a first end (41) and downstream of the filtering element (3) at a flared second end (42), which defines the opening (20), wherein the ventilation pipe (4) extends internally with respect to the removable container (2) projecting from a substantially central portion of a support base (31A) of a supporting element (31) of the filtering element (3) such that an annular portion of said support base (31A) is defined around said flared second end (42) adapted to channel a flow of liquid inside the ventilation pipe (4) for introducing liquid inside the removable container (2).

3. The drinking bowl (100) for domestic animals according to claim 1, wherein the filtering element (3) comprises a filtering bed (30).

4. The drinking bowl (100) for domestic animals according to claim 1, wherein the filtering element (3) is fixed in a removable manner to the removable container (2).

5. The drinking bowl (100) for domestic animals according to claim 4, wherein the filtering element (3) is fixed at the opening (20) of the removable container (2).

6. The drinking bowl (100) for domestic animals according to claim 1, wherein the ventilation pipe (4) has a center axis extending substantially rectilinearly between the first end (41) and the second end (42).

7. The drinking bowl (100) for domestic animals according to claim 1, wherein the flared portion (420) has a tapered form in the direction towards the first end (41) of the ventilation pipe (4).

8. The drinking bowl (100) for domestic animals according to claim 1, wherein the ventilation pipe comprises a first portion which is rigidly fixed to the filtering element and a second portion which is of elongate form.

9. The drinking bowl (100) for domestic animals according to claim 8, wherein the flared portion (420) is defined in said first portion.

10. The drinking bowl (100) for domestic animals according to claim 1, wherein the ventilation pipe comprises a first portion, which is adapted to be fixed in a removable manner to the filtering element, and a second portion which is of elongate form.

11. The drinking bowl (100) for domestic animals according to claim 1, wherein the removable container (2) has a substantially conical or cylindrical form with a base which is closed by a base wall (21) and an open base which defines the opening (20).

12. The drinking bowl (100) for domestic animals according to claim 11, wherein the first end (41) of the ventilation pipe (4) opens proximate the base wall (21).

13. The drinking bowl (100) for domestic animals according to claim 3, wherein the filtering element (3) comprises an openable enclosure, which receives, in a removable manner, the filtering bed (30) therein.

14. The drinking bowl (100) for domestic animals according to claim 3, wherein the ventilation pipe (4) extends internally with respect to the removable container (2).

15. The drinking bowl (100) for domestic animals according to claim 14, wherein the second end (42) is arranged at a substantially central portion of the filtering element (3).

16. The drinking bowl (100) for domestic animals according to claim 2, wherein the filtering element (3) comprises a filtering bed (30).

17. The drinking bowl (100) for domestic animals according to claim 2, wherein the filtering element (3) is fixed in a removable manner to the removable container (2).

18. The drinking bowl (100) for domestic animals according to claim 17, wherein the filtering element (3) is fixed at the opening (20) of the removable container (2).

19. The drinking bowl (100) for domestic animals according to claim 2, wherein the ventilation pipe (4) has a center axis extending substantially rectilinearly between the first end (41) and the second end (42).

20. The drinking bowl (100) for domestic animals according to claim 2, wherein the ventilation pipe comprises a first portion which is rigidly fixed to the filtering element and a second portion which is of elongate form.

\* \* \* \* \*